(Model.)
J. THOMPSON.
GATE.
No. 245,675. Patented Aug. 16, 1881.
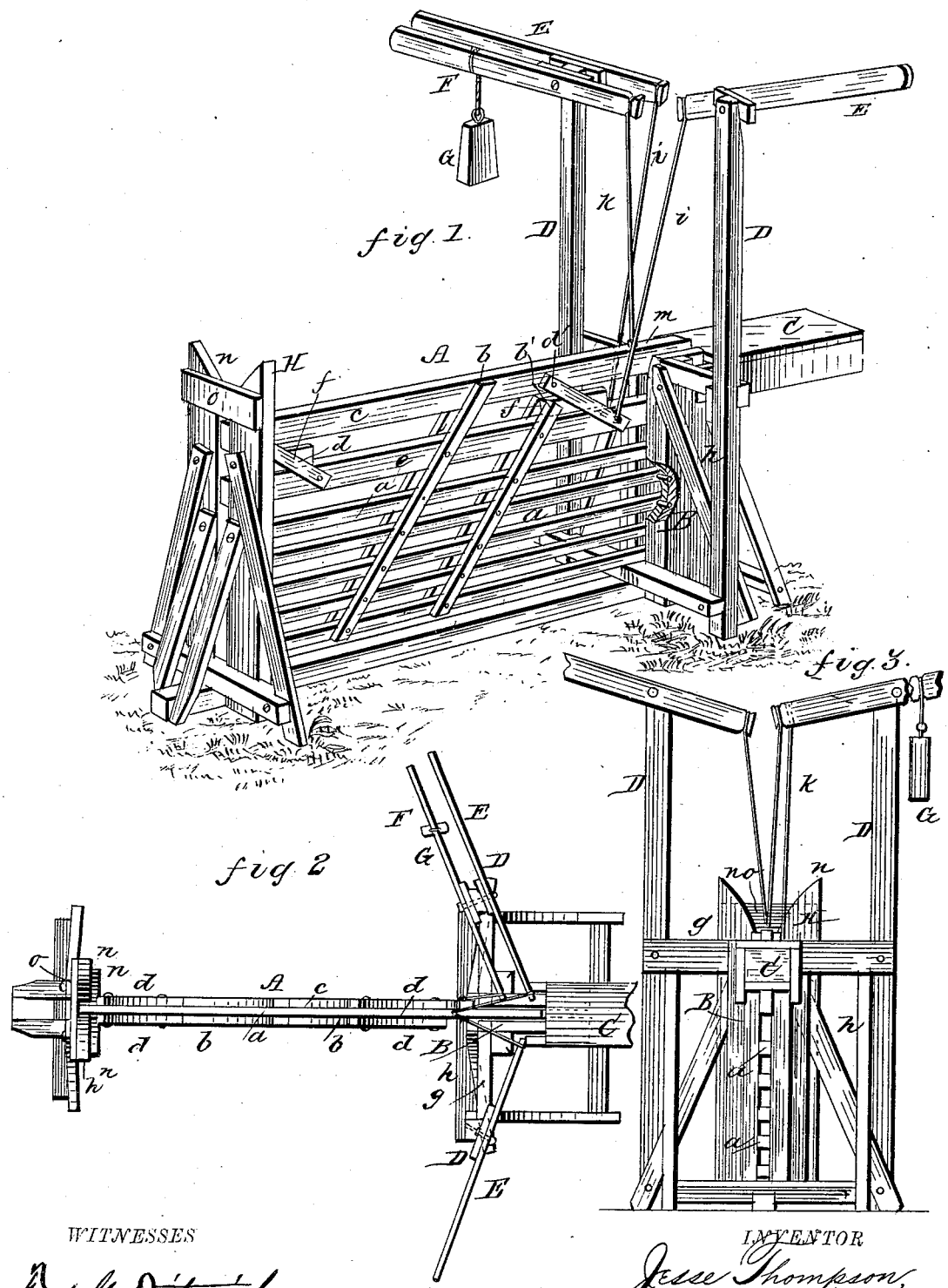
WITNESSES
Fred. G. Dieterich
Geo Binkenburg
By his Attorneys
C. A. Snow & Co.
INVENTOR
Jesse Thompson, (No Model.)
L. W. TRACY.
ELEVATOR.
No. 245,676. Patented Aug. 16, 1881.
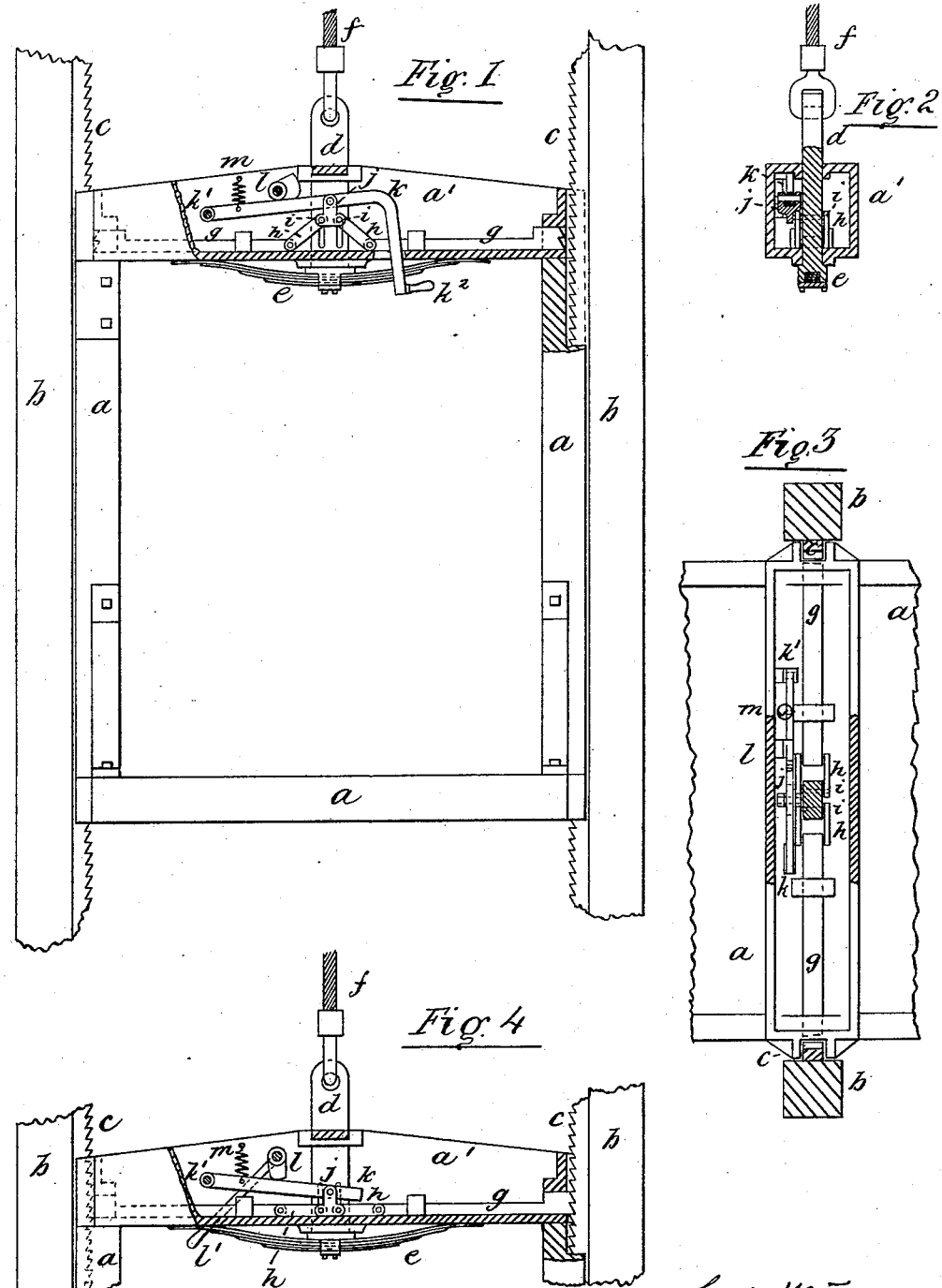
Witnesses.
H. D. Williams
Herman T. C. Kraus
Lewis W. Tracy.
Inventor
per Alfred Shedlock
Atty.